Oct. 20, 1970    B. GULISTAN    3,535,678
ELECTRICAL TERMINAL
Filed June 19, 1968    3 Sheets-Sheet 1
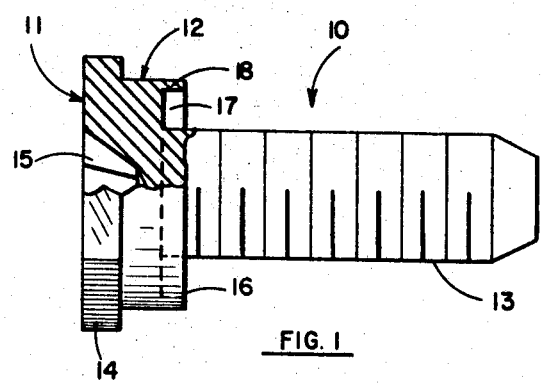
FIG. 1
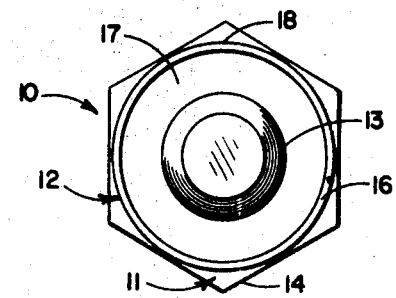
FIG. 2
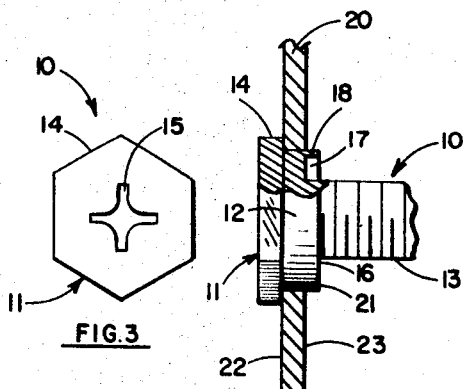
FIG. 3    FIG. 4
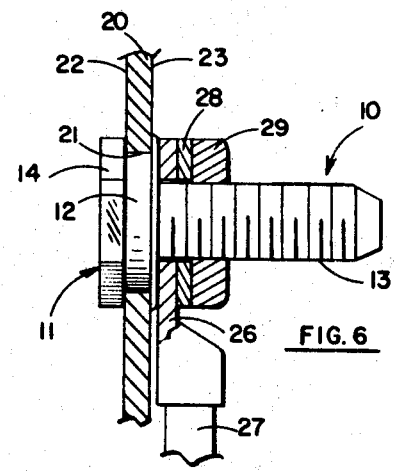
FIG. 6
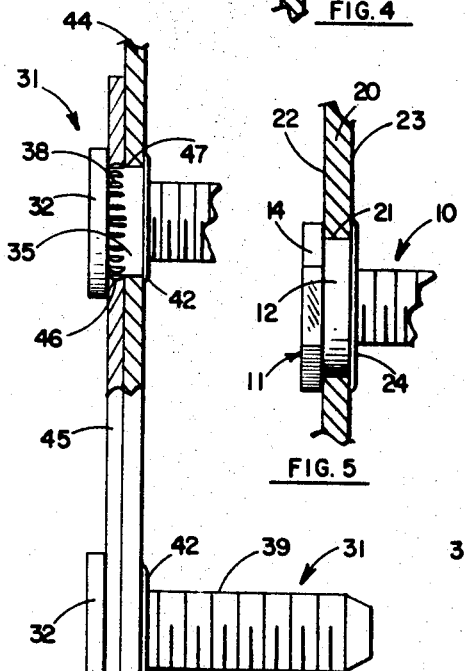
FIG. 5
FIG. 10
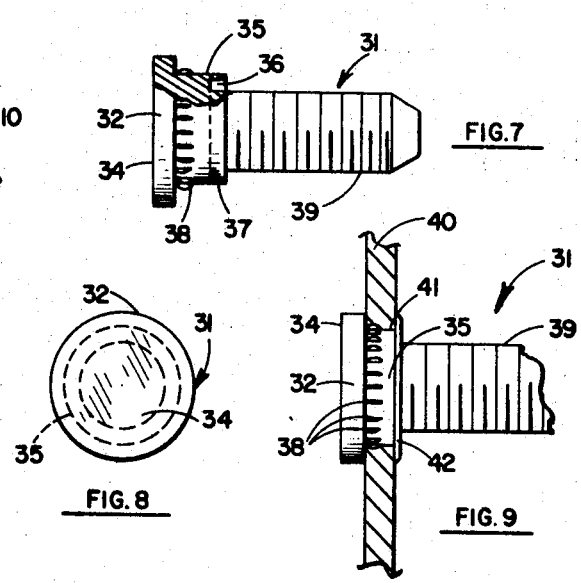
FIG. 7
FIG. 9
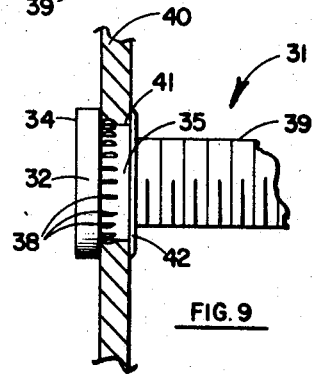
FIG. 8
INVENTOR
BULENT GULISTAN
BY
ATTORNEYS

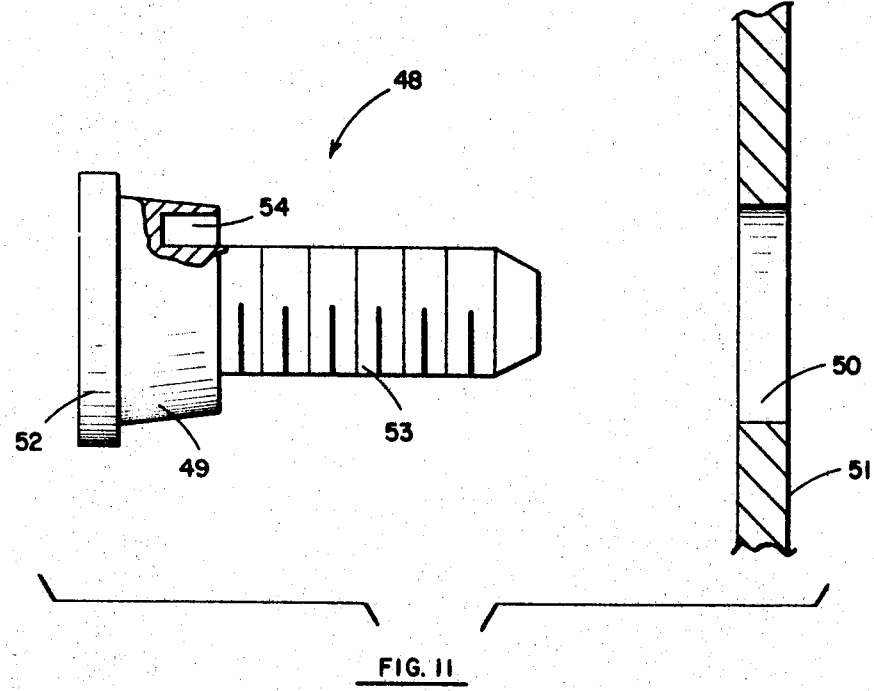
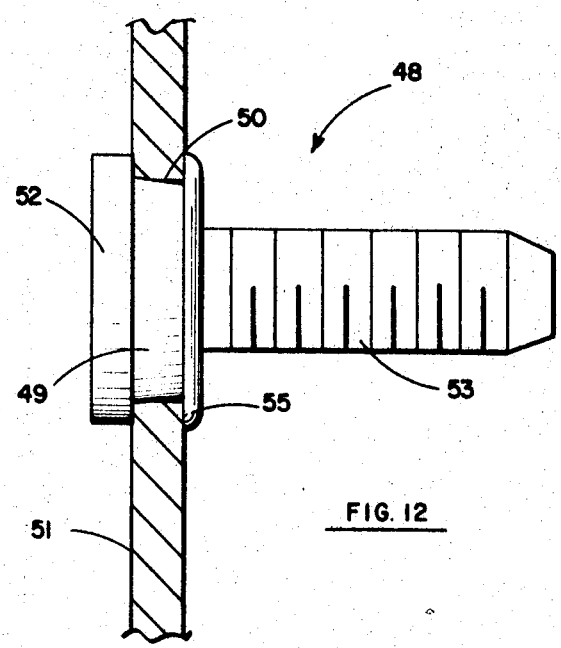
INVENTOR
BULENT GULISTAN

Oct. 20, 1970  B. GULISTAN  3,535,678
ELECTRICAL TERMINAL
Filed June 19, 1968  3 Sheets-Sheet 3

INVENTOR
BULENT GULISTAN
BY
ATTORNEYS

United States Patent Office 3,535,678
Patented Oct. 20, 1970

3,535,678
ELECTRICAL TERMINAL
Bulent Gulistan, Malibu, Calif., assignor to Deutsch Fastener Corp., Los Angeles, Calif., a corporation of California
Continuation-in-part of applications Ser. No. 627,054, Mar. 30, 1967, and Ser. No. 663,918, Aug. 11, 1967. This application June 19, 1968, Ser. No. 744,243
Int. Cl. H01r 5/08
U.S. Cl. 339—276                          7 Claims

ABSTRACT OF THE DISCLOSURE

An electrical terminal including a head adjacent which is a cylindrical or frustoconical section having a recessed end providing a portion that is bent over to form a flange to attach the terminal to a workpiece, while a stud projects beyond the cylindrical or frustoconical section. The electrical connection at the bus is made around the periphery of the cylindrical or frustoconical portion. The stud may be threaded to receive a threaded element in attaching an electrical conductor, or unthreaded to engage a crimped fitting. In the latter case, a threaded opening is included to allow the part to be held tightly against the workpiece as the flange is formed.

REFERENCE TO PARENT APPLICATIONS

This is a continuation-in-part of my copending patent application Ser. No. 663,918, filed Aug. 11, 1967, which, in turn, is a continuation-in-part of my patent application Ser. No. 627,054, filed Mar. 30, 1967, now abandoned.

BACKGROUND OF THE INVENTION

Field of the invention

The field of the invention is that of electrical terminal and fastening devices, in particular to terminals for making ground connections.

DESCRIPTION OF THE PRIOR ART

In providing an electrical grounding connection in the electrical systems of aircraft, missiles or the like, it has been customary to drill an opening through the part that acts as the ground, after which the chromate coating is removed from the surfaces of the part around both ends of the opening. Then, an assembly made up of a bolt, nut and several washers is associated with the part, with the bolt passing through the opening to be held in place by the nut. Typically, adjacent the head of the bolt there are a lock washer and a flat washer that bears against one surface of the workpiece, while an additional washer and a nut are applied to the shank of the bolt on the opposite side. The electrical connection to the part that forms the bus is made by the engagement of the washers with the cleaned flat surfaces of the part around the opening. After completing the installation, it is necessary to repaint the surface to cover all exposed surfaces from which the chromate coating previously had been removed.

Several shortcomings have resulted from this type of installation. Obviously, it is time-consuming to clean the surface of the part around the opening for securing the electrical connection when the stud is in place. Unless all the protective coating is removed at that area, it cannot be assured that an electrical circuit is maintained. Installation of these devices is laborious and awkward in assembling the several components to the grounding part. Unless there is adequate tightening of the nut, there may be no effective electrical connection to the part. Moreover, if the nut becomes loosened, as may occur from vibration during service, the electrical connection may be lost. Also, with the protective coating having been removed from the part, the installation is vulnerable to corrosion, even though the cleaned area later is repainted. The latter operation consumes added time with attendant expense. When multiple grounding stack-ups are made on these studs, stray and sometimes dangerous feedback circuits may arise in the event of loosening or loss of the ground connection.

SUMMARY OF THE INVENTION

The present invention obviates all the above-enumerated difficulties, providing an electrical terminal that is attached rapidly to the associated structure, and which results in a fully reliable connection. It includes a head portion, adjacent which is a short cylindrical section that is adapted to fit through the opening in the part. The electrical connection is made between the circumference of the cylindrical section and the wall of the opening in the part. This section alternatively may be made frustoconical to wedge in the opening and assure a low-resistance current path. Also, it may have a knurled exterior to resist rotation of the terminal when installed in a workpiece. An annular recess in the end of the cylindrical or frustoconical section provides a flange that is bent outwardly to engage one side of the workpiece, cooperating with the head on the opposite side to retain the device in place. A threaded shank, coaxial with the cylindrical or frustoconical portion and head, extends outwardly for receiving the connecting wires. This shank also may be made as an unthreaded cylindrical element to engage a crimp-fitting that connects it to the wire. This avoids the need for a knurled portion, as there is no relative rotation as the wire is connected. A threaded opening is included in this embodiment to permit the part to be firmly pulled into the opening in the workpiece when the flange is formed.

In this manner, one part replaces many, as only a single unit replaces the bolt, nut and washers previously employed. With the electrical connection made along the periphery of the cylindrical or frustoconical portion, rather than on the flat areas of the workpiece, no paint removal and subsequent paint applications are needed. The flanged connection is made rapidly and easily and, when completed, is fully reliable and will not separate in service from vibration or any other types of normal loading.

An object of this invention is to provide an improved electrical terminal device.

Another object of this invention is to provide an easily installed electrical grounding stud of simplified construction and a minimum number of parts.

A further object of this invention is to provide an electrical grounding device making an electrical connection along the circumference of the hole through which it extends, thereby requiring no paint cleaning nor reapplication of paint along the surfaces adjacent the opening.

An additional object of this invention is to provide an electrical terminal device that will remain in place against vibrational and other loads encountered and which is not vulnerable to corrosion either of the terminal or of the associated structure.

Another object of this invention is to provide an electrical terminal device secured to a part without embedment of tooth elements therein, and requiring no rotation in attaching to an electrical conductor.

These and other objects will become apparent from the following detailed description taken in connection with the accompanying drawing.

3

BRIEF DESCRIPTION OF THE DRAWING

FIG. 1 is a side elevational view, partially broken away, of the electrical terminal of this invention prior to installation;

FIG. 2 is an end elevational view of the terminal;

FIG. 3 is an end elevational view of the terminal shown on a reduced scale and taken from the head end;

FIG. 4 is a side elevational view, partially in section, showing the terminal associated with a panel ready for attachment thereto;

FIG. 5 is a side elevational view, partially in section, illustrating the terminal after attachment to a panel;

FIG. 6 is a view similar to FIG. 5, but with a grounding wire attached to the terminal;

FIG. 7 is a side elevational view of a modified form of the terminal, which is knurled to prevent rotation relative to the device to which it is attached;

FIG. 8 is an end elevational view of the head portion of the terminal of FIG. 7;

FIG. 9 is a side elevational view, partially in section, showing the terminal of FIG. 7 after installation;

FIG. 10 is a side elevational view, partially in section, showing the use of the terminal of FIG. 7 with an added strip to avoid embedment of the knurled portion in the panel to which the terminal is secured;

FIG. 11 is a side elevational view, partially in section, illustrating a modified form of the invention that includes a tapered portion for engagement with the supporting device;

FIG. 12 is an illustration of the terminal of FIG. 11 in the installed position;

DESCRIPTION OF THE PREFERRED EMBODIMENTS

Figures 13, 14, 15:
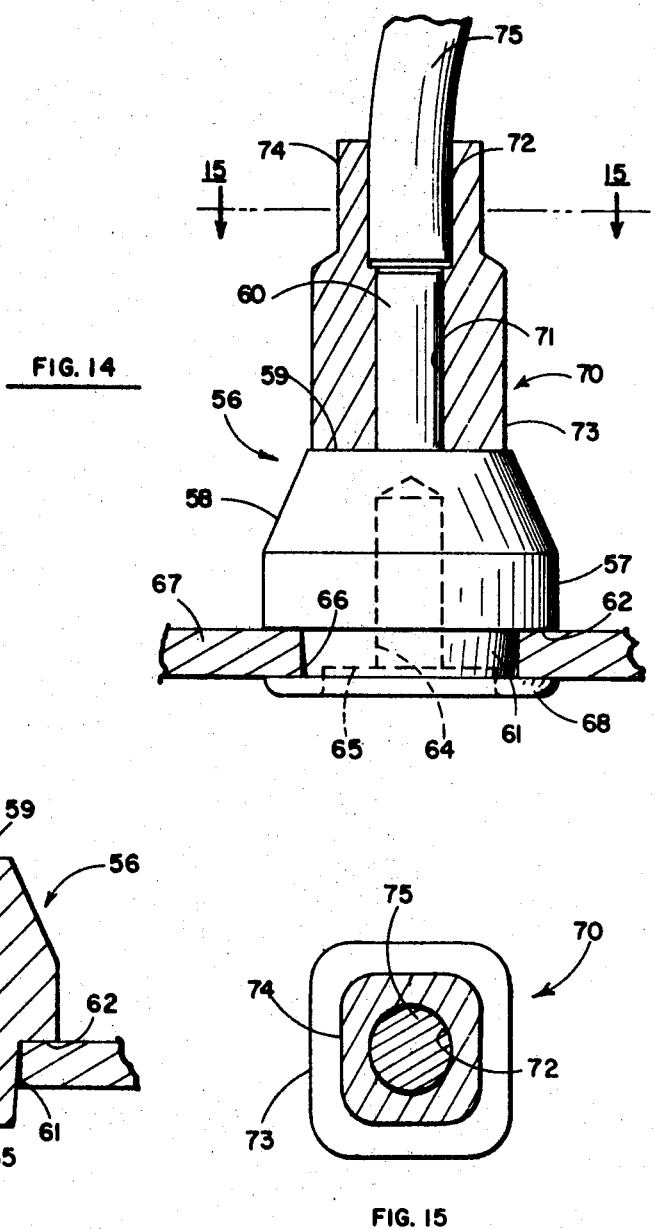
FIG. 13 is a longitudinal sectional view of a modified form of the terminal, adapted for attachment to a crimped fitting.
FIG. 14 is a side elevational view, partially in section, showing the terminal of FIG. 13 in the installed position.
FIG. 15 is a transverse sectional view taken along line 15—15 of FIG. 14.

With reference to the drawing, the terminal 10 shown in FIGS. 1 and 2 includes a head portion 11, which connects to a cylindrical section 12, from which projects a threaded shank 13. These parts are in a coaxial relationship. The head 11 is relatively thin and provided with a hexagonal exterior edge 14, which may be gripped by a wrench. It also includes a cruciform slot 15 for optional engagement by a screwdriver bit.

The cylindrical portion 12 is relatively short, but is made slightly longer than a panel with which the terminal 10 is to be associated. At the radial outer end 16 of the cyindrical portion 12 is an annular recess 17 that circumscribes the base of the shank 13. The depth of the recess 17 is less than the length of the cylindrical section 12. The result is a relatively thin annular wall 18 at the end of the section 12.

The shank 13 normally is a threaded element which extends from the center of the cylindrical part 12 from the inner end of the recessed portion 17. The shank 13 is for connection to the ends of electrical conductors, and may be varied in form to suit this purpose.

The terminal 10 is adapted for association with a panel such as the member 20 illustrated in FIG. 4 which acts as a bus in providing a ground connection. The panel 20 is provided with a circular opening 21, which is dimensioned to provide a close fit with the cylindrical portion 12 of the terminal 10. Then, the terminal is inserted through the opening 21, bringing the undersurface of the head 11 into engagement with the surface 22 of the panel, while the thin-walled portion 18 of the cylindrical portion 12 projects outwardly beyond the opposite surface 23. After this, the portion 18 is bent outwardly to provide a flat annular radial flange 24 bearing firmly against the surface 23 of the panel 20, as shown in FIG. 5. The resulting flange 24 may be formed quite rapidly and conveniently through the use of an appropriate tool, such as that illustrated in patent application Ser. No. 578,728, filed Sept. 12, 1966, for Flaring Tool.

Once this has been done, the attachment of the terminal 10 is complete. No washers, auxiliary locking devices or nuts are required in securing it to the panel. The flange 24 provides an attachment that will last indefinitely and which is fully resistant to loads encountered in service, including all vibrational forces. Thus, a permanent attachment of the one-piece terminal is obtained very quickly and easily.

The electrical connection between the terminal 10 and the panel 20 is formed at the periphery of the cylindrical portion 12 and the wall of the hole 21 in the panel. This results in a large contact area, giving an unchanging low-resistance connection between the panel 20 and the terminal 10. Because the electrical junction is along the circumferential surfaces, the panel 20 may retain a protective coating, which need not be scraped from the area around the terminal on the surfaces 22 and 23 adjacent the opening 21. This not only saves time, but also reduces the likelihood of harmful corrosion to a minimum.

After the installation of the terminal 10, the shank 13 projects beyond the surface 23 and is ready for engagement by the ground or jumper wire or other electrical conductor. As seen in FIG. 6, the apertured end fitting 26 of a conductor 27 has been fitted over the shank 13 beneath a washer held in place by a nut 29 threaded on the shank. As the nut 29 is tightened into place, the terminal 10 is prevented from rotating by engaging the head 11 at either its hexagonal outer edge 14 or its recess 15. A maximum length of the shank 13 is available for receiving the wires to be attached, in view of the absence of nuts and washers along the shank for attachment to the panel. Several conductors may be superimposed along the length of the shank 13.

When constructed in accordance with the modification illustrated in FIGS. 7, 8 and 9, the terminal is locked against rotation upon its attachment to the workpiece. Hence, with this arrangement, there is no need to engage the head with a wrench or screwdriver in order to preclude the terminal from rotating as the nut is threaded on it to secure the grounding wire to it.

The terminal arrangement 31 seen in FIG. 7 is generally similar to the previously described embodiment. However, the head 32 has a circular exterior edge and a planar outer surface 34 having no recess in it. From the head 32 extends a cylindrical section 35 having an annular recess 36 to define the thin-walled portion 37 that is to be bent over to form the flange for securing the terminal to the workpiece. Around the periphery of the cylindrical portion 35, extending for a portion only of its length adjacent the head 32, is a straight knurl 38. This results in a plurality of small axially directed projections above the surface of the cylindrical portion 35. The threaded shank 39 is similar to the shank 13 of the previously described embodiment.

In use the terminal 31, it is associated with a panel 40 by introducing the cylindrical portion 36 into an opening 41 drilled into the panel. The section 37 is bent outwardly to provide a flange 42 cooperating with the head 32 to secure the terminal 31 to the panel 40. As the terminal is inserted into the opening 41 and secured to the panel 40, the projections formed by the knurl 38 become embedded in the surface of the panel around the opening 41. Each projecting portion of the knurl digs into the material of the panel 40 around the periphery of the opening 41, resulting in a means that locks the terminal 31 against rotation relative to the panel 40. This makes the terminal 31 even simpler to use when the wires are attached to it as the nut to secure the wire to the terminal may be threaded tightly into place without attendant holding of the terminal to preclude rotation of it.

For certain installations, however, it is not permissible to use the design of the terminal 31 because of the embedment of the knurled portion in the panel. This is true, for example, of primary aircraft structure where the terminal 10 normally is utilized. For aircraft structure other than primary structure, and for other locations where the embedment of the knurl is no disadvantage, use of the terminal 31 generally is more convenient.

It is possible to employ the terminal 31 with primary aircraft structure, or in other places where embedment of the knurl is not allowed, through the technique illustrated in FIG. 10. Here, associated with a panel 44 is a thin plate 45. Openings 46 are formed in the plate 45, registering with the openings 47 through the panel 44. Then, the terminals 31 are inserted through the openings 46 and 47 and the flanges 42 are bent outwardly. When this is done, the knurled section 38 embeds itself in the wall of the opening 46 of the member 45. However, the knurl does not extend to the opening 47, and hence does not affect the continuity of the primary structural element 44. With the simple addition of the thin plate 45, therefore, the convenience of the knurled terminal 31 may be retained, regardless of the nature of the device to which the terminal is secured. The plate 45 also adds a second current path to that provided by the member 44 between the attached terminals 31, desirable in some instances.

Of course, it is necessary that the plate 45 be held against rotation if it, in turn, is to prevent the rotation of the terminals 31. When two or more terminals are to be connected to a single panel, as frequently is the case and as illustrated in FIG. 10, the presence of the two terminals holds the plate 45 against rotation.

When using the arrangement of FIG. 10, the cylindrical section of the terminal must be long enough to allow a portion to extend beyond the panel to be bent outwardly to form a flange. For any use, the terminal may be adapted to parts of different thicknesses by varying the length of the cylindrical section.

The arrangement illustrated in FIGS. 11 and 12 assures the existence of a low-resistance current path to the supporting member irrespective of tolerances between the parts at the opening for the terminal device. This design is particularly useful for larger sizes where close tolerances may not be as easily maintained. In this embodiment, instead of a cylindrical section adjacent the head, the terminal 48 is provided with a frustoconical section 49 which converges in diameter toward its outer end. This portion 49 is adapted to fit within a straight cylindrical opening 50 in the panel 51.

Other than replacing the cylindrical section with one of frustoconical configuration, the terminal 48 is similar to the terminals described above. Thus, the head 52 may be hexagonal for engagement by a wrench or include a recess for engagement by a screwdriver bit. The threaded shank 53 projects beyond the outer end of the frustoconical section 49 and is coaxial with that section and the head. A recess 54 in the end of the frustoconical section 49 around the shank provides the thin-walled portion adapted to be bent outwardly to form the flange 55 when the terminal 48 is installed in the panel 51, as shown in FIG. 12.

When the flange is formed and the terminal is locked in place, the frustoconical section 49 wedges tightly into the opening 50, assuring intimate contact and a good current path to the structure 51. Because of the engagement between the tapering surface 49 of the terminal and the wall of the opening 50, firm contact may be assured through a range of tolerances between the diameter of the section 49 and that of the opening 50.

The amount of taper has been exaggerated in the drawing for purposes of illustration, and actually may be somewhat less than that shown. A 1° taper is adequate to produce the desired effect. While the section 49 normally has a smooth exterior, it may be provided with a knurl as in the embodiment of FIGS. 7–9, if desired.

The requirement for either a hexagonal head, as in the embodiment of FIGS. 1 and 2, or a knurl, as in FIGS. 7, 8 and 9, to prevent rotation of the device may be avoided by the arrangement of FIGS. 13, 14 and 15. Here, the wire is attached to the stud of the electrical terminal device by crimping, so that nothing is rotated when the wire is secured. Hence, resistance to rotation by the terminal device is of no significance.

The terminal 56 shown in FIGS. 13, 14 and 15 includes a base portion 57 of cylindrical shape, beyond which is a frustoconical portion 58. A radial wall 59 is at the apical end of the portion 58, and from its center projects a shank 60. The latter element has a straight cylindrical surface without threads.

Beyond the cylindrical base portion 57 in the other direction, the element 56 includes a section 61 of reduced cross-sectional dimension. This portion preferably has a slight taper on its exterior surface, convergent toward the outer end as for the section 49 in the embodiment of FIGS. 11 and 12. A radial shoulder 62 interconnects the portions 57 and 61 of the device. A bore 63 extends into the end of the terminal 56 opposite from the shank 60. This provides the end of the section 61 with a relatively thin wall for forming an attaching flange as in the previously described arrangements. A blind tapped hole 64, smaller in diameter than the bore 63, extends axially inwardly from the inner radial end wall 65 of the bore 63.

In use of the terminal 56, the section 61 is introduced into a cylindrical opening 66 in a workpiece 67, and positioned with its shoulder 62 adjacent one side of the workpiece. After this, the end of the section 61 is bent outwardly to form a flange 68, as seen in FIG. 14. As the flange 68 is formed, the terminal 56 may be engaged by a member at the opening 64 and pulled to wedge the section 61 into the opening 66 in the workpiece 67, and to provide firm engagement between the shoulder 62 and the surface of the workpiece. The threads in the opening 64 provide the means to grip a threaded member extended into it. Without the ability to exert an axial pull at the opening 64, it would be difficult and time-consuming to force the section 61 all the way into the opening 66, while bending a flange 68 that would cooperate with the shoulder 62 to confine the workpiece at the perimeter of the opening without looseness. In the embodiments described above, the threaded terminal shanks serve a purpose similar to that of the threaded opening 64 in allowing the device to be engaged by a threaded member and forced securely against the workpiece as the flange is formed. However, the unthreaded shank 60 is not readily adapted to receive a tension force during the formation of the flange.

The exterior of the cylindrical base portion 57 is of sufficient diameter to provide the radial shoulder 62 and to permit the opening 64 to be of adequate diameter. Beyond the section 57, however, the frustoconical portion 58 decreases the width of the device, with attendant reduction in mass. This minimizing of the weight of the terminal is of particular signficance for aircraft use.

With the terminal 56 secured ot the workpiece 67, as shown in FIG. 14, the fitting 70 is attached to the unthreaded shank 60. A bore extends through the fitting 70, the lower portion 71 of the bore having a smaller diameter than that of the upper portion 72 of the bore. Also, the outer surface 73 at the lower portion of the fitting is of greater cross-sectional dimension than the upper portion 74. The wire 75 to be connected to the terminal 56 is received within the upper bore portion 72, while the lower bore 71 fits over the shank 60. The fitting 70 is crimped to tightly grip both the shank 60 and the wire 75.

The fitting 70 is elongated laterally in one direction, as best seen in FIG. 15. It is crimped in place by applying a compressive force across the portions of shorter dimension laterally. It is removable by applying force across the longer direction, which loosens it from the stud and from the wire 75 as desired.

The foregoing detailed description is to be clearly understood as given by way of illustration and example only.

I claim:

1. An electrical terminal comprising a member having an intermediate section of relatively large lateral dimension,
an elongated shank projecting from said intermediate portion in one direction,
said shank being of smaller lateral dimension than that of said intermediate portion,
and an end portion projecting in the opposite direction from said intermediate portion,
said end portion having a smaller outside lateral dimension than that of said intermediate portion, whereby a shoulder is defined between said intermediate portion and said end portion,
said end portion having a substantially smooth exterior surface of circular cross section,
said end portion having a substantially cylindrical bore extending therein providing the outer end of said end portion with a relatively thin wall bent outwardly to form a flange for cooperating with said shoulder and securing said member to a workpiece,
said member further having a threaded opening extending inwardly from and of smaller dimension than said bore for engagement by a tool for holding said member while said end portion is bent outwardly to form said flange.

2. A device as recited in claim 1 in which the exterior of said intermediate portion beyond said shoulder and adjacent said shank converges toward said shank for thereby minimizing the weight of said intermediate portion.

3. A device as recited in claim 1 in which said member includes a radial surface around said shank and formed on the end of said intermediate portion adjacent said shank, said shank being unthreaded and of cylindrical configuration.

4. A device as recited in claim 1 in which said end portion is outwardly convergent from a location adjacent said shoulder to the distal end of said end portion.

5. A device as recited in claim 4 in which said end portion is frustoconical.

6. An electrical terminal device comprising
a member having a first portion of a first lateral dimension,
a second portion of a second and smaller lateral dimension,
thereby providing a shoulder between said first and second portions,
said second portion having a substantially smooth frustoconical outer surface,
and a shank projecting from said first portion for engagement by an electrically conductive member,
said second portion having an opening extending axially therein,
said opening having an unthreaded outer portion providing said second portion with a relatively thin wall,
the outer end of said second portion bent outwardly to form a flange for cooperating with said shoulder in holding said member to a part,
said opening having a threaded inner portion for providing a means for gripping an element extended therein for holding said shoulder in engagement with a part during the bending of said flange,
said threaded inner portion being smaller in diameter than said outer portion and extending into said first portion of said member.

7. A device as recited in claim 6 in which said shank is an elongated cylindrical element in axial alignment with said opening.

References Cited

UNITED STATES PATENTS

| | | | |
|---|---|---|---|
| 914,327 | 3/1909 | Barbour | 339—220 |
| 2,138,409 | 11/1938 | Salter | 85—32 |
| 2,327,656 | 8/1943 | Meek | 285—49 |
| 2,456,118 | 12/1948 | Foster | 174—153 |
| 2,465,654 | 3/1949 | Millard | 339—214 |
| 2,962,691 | 11/1960 | Mande et al. | 339—214 |
| 2,990,533 | 6/1961 | Huges et al. | 339—17 |
| 3,377,039 | 4/1968 | Hayes | 248—119 |

FOREIGN PATENTS

| | | |
|---|---|---|
| 511,447 | 3/1955 | Canada. |
| 960,663 | 4/1950 | France. |
| 690,252 | 4/1953 | Great Britain. |

MARVIN A. CHAMPION, Primary Examiner

J. H. McGLYNN, Assistant Examiner

U.S. Cl. X.R.

151—41.72; 174—153